United States Patent [19]

Tiemeyer

[11] Patent Number: 5,366,520

[45] Date of Patent: Nov. 22, 1994

[54] FILTRATION FUEL APPARATUS AND METHOD

[76] Inventor: Eric Tiemeyer, 375 E. Las Colinas #173, Irving, Tex. 75039

[21] Appl. No.: 920,860

[22] Filed: Jul. 28, 1992

[51] Int. Cl.$^5$ .............................................. C10L 5/48
[52] U.S. Cl. .................................... 44/629; 44/639; 210/694; 210/502.1
[58] Field of Search .................. 44/629, 639; 210/694, 210/693, 532.2, 502.1

[56] References Cited

U.S. PATENT DOCUMENTS

| | | | |
|---|---|---|---|
| 3,762,989 | 10/1973 | Timpe | 423/207 |
| 4,164,396 | 8/1979 | Jones | 44/629 |
| 4,507,208 | 3/1985 | Simon et al. | 210/778 |
| 4,525,277 | 6/1985 | Tiemeyer | 210/532.2 |
| 4,615,794 | 10/1986 | Belanger | 210/778 |
| 4,710,298 | 12/1987 | Noda et al. | 210/778 |
| 4,737,582 | 4/1988 | Goldman et al. | 536/2 |
| 4,741,840 | 5/1988 | Atherton et al. | 210/778 |
| 4,882,058 | 11/1989 | Burton | 210/662 |
| 5,076,936 | 12/1991 | Nietz | 210/662 |
| 5,087,370 | 2/1992 | Schultheis | 210/638 |
| 5,147,852 | 9/1992 | Cowan et al. | 252/8.551 |

FOREIGN PATENT DOCUMENTS 58-0117285A 12/1983 Japan .................. 44/629

OTHER PUBLICATIONS

Grant, Hackh's Chemical Dictionary, Fourth Edition, McGraw-Hill Book Company, N.Y., 1969, p. 370.

Primary Examiner—Margaret Medley
Attorney, Agent, or Firm—John E. Vandigriff

[57] ABSTRACT

An apparatus and method for converting petroleum related hazardous waste material utilizes a modified tanker truck and a filter consisting of hydrophobic material and activated carbon to separate the water content of the waste while capturing the solids contend yielding a high BTU-content fuel.

2 Claims, 2 Drawing Sheets

Hazardous waste (oil, water, solids) is pumped into the tanker truck

FILTRATION FUEL APPARATUS AND METHOD

FIELD OF THE INVENTION

This invention relates to processing of hazardous wastes generated by petroleum refining and/or production, and more particularly to an apparatus and method for processing hazardous waste to be used as fuel in industrial furnaces and boilers.

BACKGROUND OF THE INVENTION

Certain hazardous wastes generated by the petroleum industry (K048, K049, K051, F037 and F038) are emulsified mixtures of solids, water, and oil that are extremely difficult to treat, transport, and dispose of. These wastes, in their original state, cannot be directly used as a fuel without considerable dewatering, nor can they be feasibly transported in conventional liquids tankers due to their high solids content. Costs associate with dewatering, transporting, and disposing of these wastes have become very burdensome to the petroleum refining industry.

SUMMARY OF THE INVENTION

The filtration process of the invention utilizes a modified dry-chemical or cement tanker truck (hereinafter referred to as tanker) to dewater wastes and transport them directly to a permitted industrial furnace and/or industrial boiler in solid form. Refinery hazardous wastes are pumped from the generator's storage tanks directly into the top of the modified tanker truck at a predetermined pressure, temperature, and flow rate. The tanker truck has previously been filled with an inexpensive, light-weight, high BTU-content hydrophobic filtration media and a small amount of granular activated carbon (GAC). The waste is filtered through the hydrophobic filtration media which absorbs the oil and traps the solids. Particle sizes of the hydrophobic media are distributed such that solids plugging does not occur until the media is saturated with oil.

The water constituent of the waste passes through the hydrophobic media without absorption, then through the granular activated carbon where trace amounts of organic material are removed, and is finally discharged out the bottom of the tanker truck and into the generators's permitted waste water treatment plant. The process continues until the hydrophobic media becomes saturated with oil. The oil-saturated media and solids are then transported directly to a permitted industrial furnace and burned as a high BTU fuel source.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
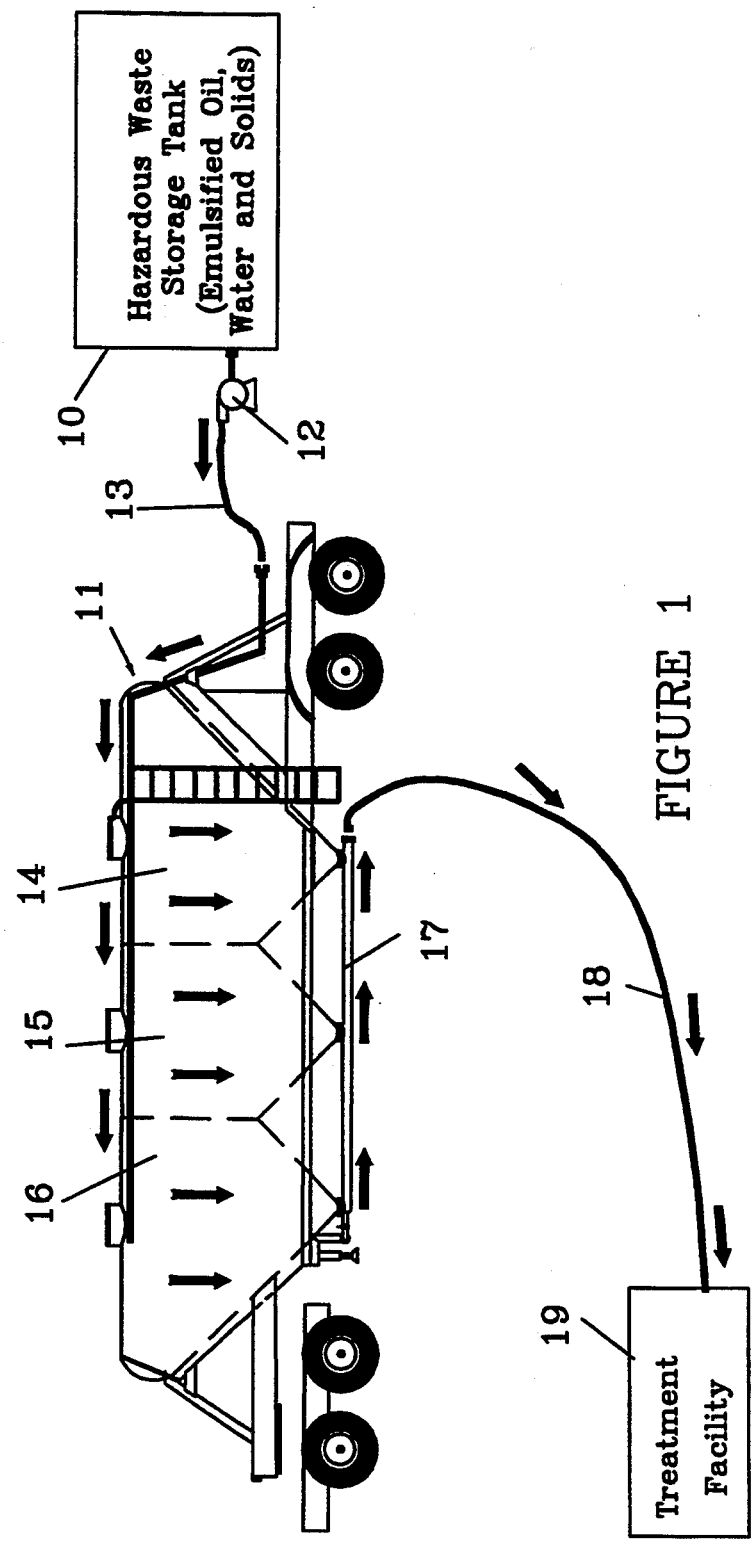
FIG. 1 Illustrates the loading of hazardous waste into a modified tanker truck.

FIG. 1 is an overall view of the hazardous waste processing system. The hazardous waste, made up of emulsified oil, water and solids is pumped from a storage tank 10 through pump 12 and pipeline 13 into a processing/transportation tanker 11. The tanker is of the type used to transport dry chemical or dry cement. Tanker 11 is divided into compartments 14, 15 and 16. The number of compartments depend upon the size of the tanker, but the tanker may have one or more compartments.

The hazardous waste material is pumped into the tanker for processing, as described below. During processing, water separated from the hazardous waste is pneumatically drawn out of the bottom of the tanker and pumped or drained through pipe 18 into a waste water treatment facility 19. At this point, the emulsified oil and solids have been removed from the water and the water has been polished (by the activated carbon 24). The process flow is shown by a plurality of arrows along the pipe into the processing tanker, through the tanker processing compartments, and out the bottom of the compartments, through pipe 18 a waste into water treatment facility 19.

Figure 2:
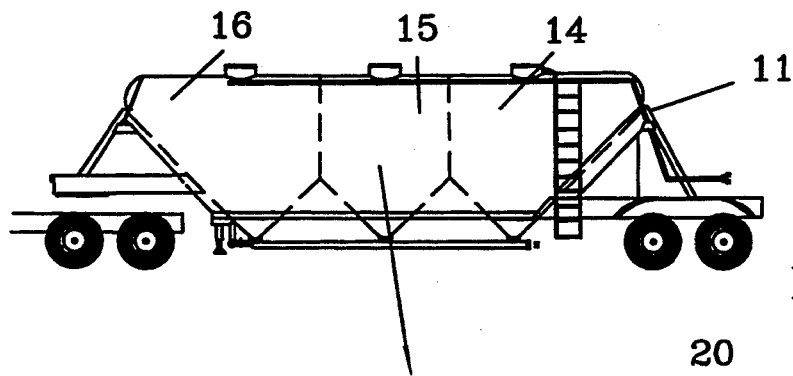
FIG. 2 shows a modified tanker truck.
Figure 3:
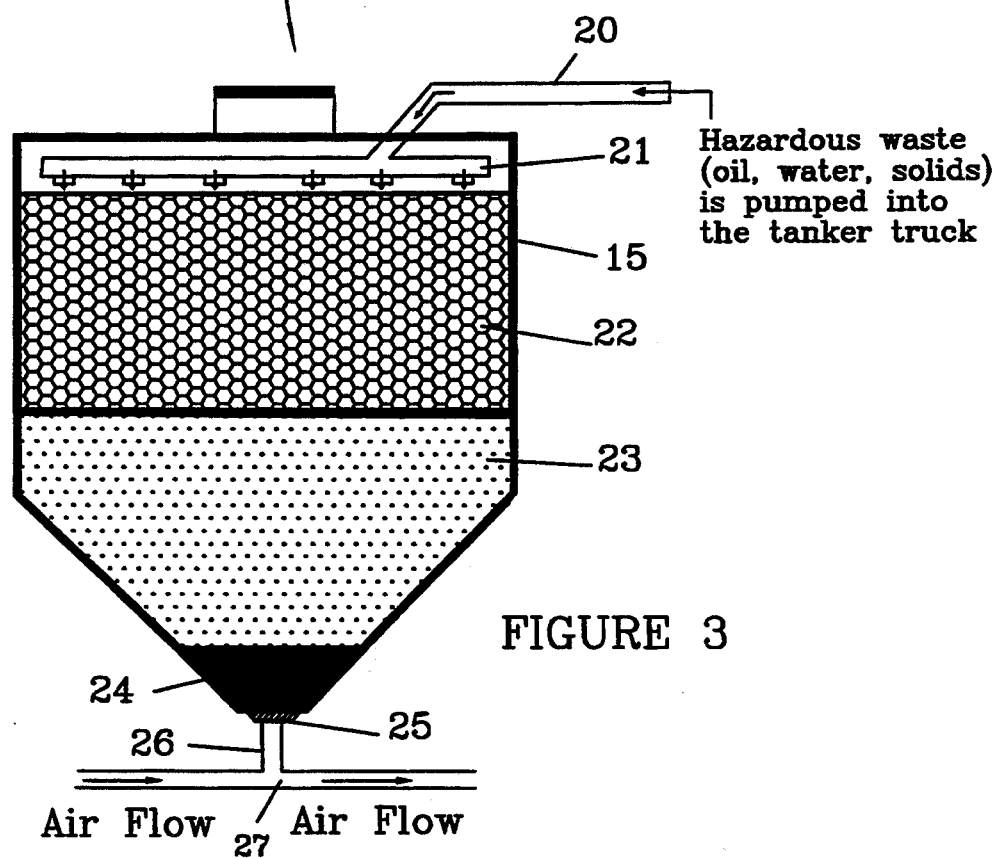
FIG. 3 is a cross sectional view of one of the sections of the modified tanker truck showing the material for processing the hazardous waste material.

FIG. 2 is a view of the processing tanker, showing its relation to one of the processing compartments, illustrated in FIG. 3.

FIG. 3 is a cross-sectional view of a processing compartment in tanker 11. Compartment 15 has in-fluent pipe 20 through which the hazardous waste, including oil, water and solids, is introduced into compartment 15. Pipe 20 introduces the waste material into a manifold 21 which distributes the waste material over the upper area of the compartment. Compartment 15 is filled with a large particle size hydrophobic media 22. Beneath large particle size hydrophobic media 22 is a second layer of hydrophobic media 23 having a particle size smaller than the material 22. Beneath hydrophobic media 23 is a layer of granular activated carbon 24. At the bottom of compartment 15, below the granular activated carbon is a filter pad to prevent the carbon from filling discharge pipe 26, but having a filter such that water will pass through to discharge pipe 26. Beneath discharge pipe 26 is a pipe 27 having an air flow as indicated by the arrows. The air flow draws the water from compartment 15, and carries it to the treatment facility 19 (FIG. 1).

Hydrophobic media 22 and 23 is a hydrophobic filtration media which absorbs oil and captures suspended solids, but permits the water content of the hazardous waste to pass through the system. By using a first large particle layer of hydrophobic media and then a smaller size, solids plugging does not occur until the media is saturated with oil.

The hydrophobic media is such that it does not absorb water. Hydrophobic media includes a non-wood fiber plant know as Kenaf. The central core of the plant is made up of a very absorbent woody fiber. A material known as K-Core is produced by Natural Fibers of Louisiana, Inc. of Jeanerette, La. K-Core, which is made form the central core of the Kenaf plant, is a hydrophobic material and can be made in different particle sizes. K-core, when subjected to oil and water will absorb the oil and not the water, allowing the water to pass through a filter made of K-core.

After the hydrophobic media in compartment 15 becomes saturated, tanker 11 is then transported to a manufacturing facility, such as a cement plant, requiring a high BTU fuel source. The oil saturated hydrophobic media provides a high BTU fuel source and may be burned in an industrial furnace licensed to burn such material.

What is claimed:

1. A transportable apparatus for processing petroleum related hazardous waste material, and removing the water content thereof and yielding a high BTU-content material, comprising:

a modified dry chemical/cement tanker truck having at least one processing compartment therein;

a first fibrous hydrophobic filter of a Kenaf material of one particle size in said transport tanker;

a second fibrous hydrophobic filter of a Kenaf material of a particle size smaller than the size of said first hydrophobic material adjacent said first hydrophobic material; and a layer of granulated activated carbon adjacent said second hydrophobic material;

wherein said first and second hydrophobic materials and carbon are arranged such that hazardous waste is filtered through the first hydrophobic material, through said second hydrophobic material and said granular activated carbon, removing the water content thereof and capturing the suspended solids, and petroleum related content of said waste material is absorbed and held by said hydrophobic material.

2. A method for processing petroleum related hazardous waste material, in a transportable vehicle, to remove the water content, capture the suspended solids, and thereby produce a high BTU-content burnable fuel, comprising the steps of:

pumping the waste material to a filtering tank in the form of a modified transportable dry chemical/cement tanker;

filtering the waste material through a first fibrous hydrophobic filter of a Kenaf material of one particle size to absorb the petroleum related products while capturing suspended solids and passing the water content through the first hydrophobic material, and filtering the waste material through a second fibrous hydrophobic filter of a Kenaf material of a particle size smaller than the size of said first hydrophobic material adjacent said first hydrophobic material to absorb the petroleum related products while capturing suspended solids and passing the water content through the second hydrophobic material, filtering the water through a granular activated carbon; wherein said first and second hydrophobic materials and carbon are arranged such that hazardous waste is filtered through the first hydrophobic material, through said second hydrophobic material and said granular activated carbon, removing the water content thereof and capturing the suspended solids, and petroleum related content of said waste material is absorbed and held by said hydrophobic material; and removing the water from the processing tanker utilizing pneumatic pressure;

wherein the hydrophobic material with the petroleum related material is transported in the filtering tank and used as a fuel in a licensed industrial furnace.

* * * * *